United States Patent [19]

Janota

[11] Patent Number: 5,763,379

[45] Date of Patent: Jun. 9, 1998

[54] DRYING-AID COMPOSITION

[75] Inventor: Timothy E. Janota, Edgerton, Wis.

[73] Assignee: Tomah Products, Inc., Milton, Wis.

[21] Appl. No.: 632,276

[22] Filed: Apr. 15, 1996

[51] Int. Cl.$^6$ ............................. C11D 3/18; C11D 1/62; C11D 3/44; C09G 1/04

[52] U.S. Cl. .......... 510/245; 510/180; 510/181; 510/182; 510/187; 510/189; 510/251; 510/259; 510/268; 510/365; 510/409; 510/421; 510/433; 510/504; 510/271; 106/8; 106/11; 106/10

[58] Field of Search ................... 106/8, 11, 10; 510/181, 182, 187, 189, 251, 259, 268, 365, 409, 421, 433, 504, 271

[56] References Cited

U.S. PATENT DOCUMENTS

| | | |
|---|---|---|
| 4,265,663 | 5/1981 | Gilicinski et al. |
| 4,354,871 | 10/1982 | Sutton ................................. 106/3 |
| 4,665,116 | 5/1987 | Kornhaber et al. |
| 5,208,403 | 5/1993 | Buchanan et al. |
| 5,612,308 | 3/1997 | Woo et al. ........................... 510/423 |

*Primary Examiner*—Paul Lieberman
*Assistant Examiner*—Charles Boyer
*Attorney, Agent, or Firm*—Jansson, Shupe, Bridge & Munger, Ltd.

[57] ABSTRACT

An improved compound for use as a spray wax and drying aid in automatic vehicle-washing devices. The invention includes an olefin constituent having the general structural formula:

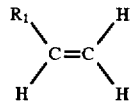

wherein $R_1$ is an alkyl group having between 4 to 28 carbon atoms and a first emulsifier having a cationic constituent. Certain preferred embodiments include a second emulsifier and a coupling agent.

25 Claims, No Drawings

DRYING-AID COMPOSITION

FIELD OF THE INVENTION

This invention is related generally to coating compositions and, more particularly, to compositions which coat and facilitate removal of water from body surfaces of automobiles and the like.

BACKGROUND OF THE INVENTION

Virtually everyone who has ever owned an automobile has had the automobile cleaned at an automatic car wash. Automatic car washes typically clean the body surface of the vehicle by successive cycles of washing and rinsing followed by drying. Water is typically sprayed onto the vehicle surface during each washing and rinsing cycle. Drying is most preferably performed by a jet of warm air. Automatic washing equipment is also useful to clean dirt and grime from the exterior surfaces of other vehicles such as trucks, motor homes, aircraft and the like.

"Spray wax" coatings are often used with automatic cleaning machines to improve the appearance of the vehicle and facilitate the automated cleaning process. The term "spray wax" is a generic term used in the industry to describe coatings which may or may not actually include wax constituents. The spray wax is typically applied to the vehicle after washing and during the final rinse cycle. The spray wax plates onto the vehicle body surface and provides a gloss or luster to the surface thus improving the perceived appearance of the vehicle.

The spray wax also facilitates the automated cleaning process because it aids in drying and in removal of water from the vehicle. Specifically, the hydrophobic constituents of the spray wax cause water on the vehicle surface to bead. Beading of water on the body surface is desirable because the air jet removes beaded water more efficiently than water which is not beaded.

The greater the size of the beads and the faster the beads form, the more rapidly and efficiently the air jet can remove the water from the surface. Thus, use of a spray wax makes the cleaning operation more efficient both by decreasing the time needed to complete the vehicle-wash process and by reducing the need for drying the surface by hand with a cloth.

The typical, old style, spray wax consists of a hydrophobe such as mineral seal oil, an emulsifier such as a quaternary ammonium salt, ethoxylated amines or nonionic surfactants, a glycol ether coupling agent and water. Certain silicones have been used as the hydrophobic constituent on the theory that such compounds increase the durability of the coating.

Most of these spray waxes or drying aids are sold in dilute solutions of about 35 to 45% active spray wax and are applied to the vehicle in a much more dilute solution. Preferable dilutions for application to a vehicle surface are in the range of 0.25 to 2%.

Old style spray waxes, particularly those using mineral seal oil as the hydrophobe, have a number of significant disadvantages. One important disadvantage is that the rate of water bead formation is too low meaning that these prior art compounds require excessive time for water to clear from the surface area being cleaned. A low rate of bead formation undesirably increases the time and labor costs needed to wash each vehicle.

Another problem inherent in certain old style spray waxes is that such compositions lack durability. Specifically, certain old style spray waxes tend to degrade and lose their gloss and water-beading effect after repeated rinsings.

High material costs are also an important disadvantage of certain old style spray waxes. For example, spray waxes using silicone as the hydrophobe cost more to produce than spray waxes utilizing an oil-based hydrophobe such as mineral seal oil because silicone is more expensive than the oil.

An improved spray wax which would facilitate removal of water from a body surface, add long-lasting luster to such surface and which is economical and easy to formulate would represent an important advance in the art.

OBJECTS OF THE INVENTION

It is an object of this invention to provide an improved spray wax overcoming some of the problems and shortcomings of compositions of the prior art.

Another object of this invention is to provide an improved spray wax which facilitates removal of water and cleaning agents from a body surface being cleaned by an automatic washing device.

Yet another object is to provide an improved spray wax which adds a long-lasting luster to a body surface being cleaned by an automatic washing device.

A further object is to provide an improved spray wax which is economical and uses readily available constituents.

These and other important objects will be apparent from the following descriptions and examples.

SUMMARY OF THE INVENTION

The present invention is directed to improved spray wax or rinse or drying aids for use with automatic washing machines used to clean automobiles and other vehicles. The inventive composition may be prepared and sold without water as a dilutable concentrate or in a dilute pre-mixed form to which additional water may be added. Typically the dilute pre-mixed form of the inventive formula includes about 35 to 45% active spray wax.

An important aspect of the invention is the use of 10 to 80% of at least one alpha olefin as the primary hydrophobe component of the invention and 20 to 90% of an emulsifier composition including at least one cationic constituent. The cationic constituent of the invention emulsifies the olefin in water. Such composition plates out on the surface and forms a water-repellant coating.

The alpha olefin constituent of the invention has the general structural formula:

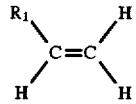

wherein $R_1$ is an alkyl group having between 4 to 28 carbon atoms. Preferably, $R_1$ of the olefin is an alkyl group having between 10 to 26 carbon atoms. It has been found that superior results are produced by compositions including alpha olefins having between 16 and 28 carbon atoms. Accordingly, it is most highly preferred that the olefin is selected from the group consisting of 1-hexadecene, 1-octadecene, 1-eicocene, 1-doeicocene, 1-tetraeicocene, 1-hexaeicocene, 1-octaeicocene and mixtures thereof.

The cationic constituent of the emulsifier is preferably selected from the group consisting of amido amine quaternary salts, amido amine salts, alkyl amine salts, alkyl diamine salts, alkyl quaternary salts, dialkyl amine salts, dialkyl quaternary salts, alkyl ether amine salts, alkyl ether diamine salts, alkyl ether amine quaternary salts, ethoxylated amines, ethoxylated ether amines, imidazoline quaternary salts imadazoline salts, amine oxides and mixtures thereof. The dialkyl quaternary salts are mose preferably selected from the group consisting of ditallow dimethyl ammonium chloride, ditallow dimethyl ammonium methosulfate, dicoco dimethyl ammonium chloride, dicoco dimethyl ammonium methosulfate and mixtures thereof.

Preferred embodiments of the inventive composition further include up to 50% of a second emulsifier composition. The purpose of the second emulsifier is to further adjust the balance of hydrophobic and lipophobic constituents so that the compound remains solubilized when mixed with water.

The second emulsifier is selected from the group consisting of nonionic surfactants, amphoteric surfactants and mixtures thereof. Preferred nonionic surfactants for the second emulsifier are selected from the group consisting of ethoxylated alkyl phenols, ethoxylated alcohols and mixtures thereof.

Preferred amphoteric surfactants which also may be used as the second emulsifier are preferably selected from the group consisting of amino acid amphoterics and betaines including mixtures of such constituents. The amino acid amphoterics are most preferably selected from the group consisting of alkyl amine propionates, alkyl amine dipropionates, N-alkyl-(beta)-imino acids, imadazoline carboxylates and mixtures thereof. The betaines are most preferably selected from the group consisting of carboxybetaines and sulfobetaines and mixtures thereof.

The composition may also include up to 50% of a coupling agent to assist in making the composition and keeping the constituents in solution when mixed with water. The coupling agent is a solvent which greatly aids in the coupling of incompatible fluids such as oil and water and prevents thickening and gelation when the composition is diluted with water. Such gelation can cause problems in automatic car washes when it is desired to inject the inventive composition into a water stream or when mixing it in a tank.

The coupling agent is preferably selected from the group consisting of glycol ethers, alcohols and mixtures thereof. Suitable glycol ethers are most preferably selected from the group consisting of ethylene glycol monobutyl ether, diethylene glycol monobutyl ether, propylene glycol monobutyl ether, propylene glycol monopropyl ether, dipropylene glycol monobutyl ether, dipropylene glycol monomethyl ether and mixtures thereof. The alcohol may be selected from the group consisting of methanol, ethanol, propanol, isopropanol, butanol, pentanol, hexanol and mixtures thereof.

The most highly preferred embodiments of the invention include 10 to 80% of at least one olefin as the primary hydrophobe component of the invention, 20 to 90% of an emulsifier composition including at least one cationic constituent, up to 50% of a second emulsifier composition and up to 50% of a coupling agent.

As stated above, the invention may be prepared in a dilutable pre-mixed form by addition of up to about 70% water. It is most highly preferred that this inventive composition include about 55 to 65% water so that the dilute composition has about 35 to 45% active constituents. Typically, this pre-mixed form of the invention would be diluted further with water prior to application to a vehicle surface. It would be expected (but not required) that the inventive composition would be applied to a vehicle surface in a dilute form having about 0.25 to 2% active constituents.

DETAILED DESCRIPTIONS OF THE PREFERRED EMBODIMENTS

Preferred constituents for Applicant's invention are available from commercial sources. Suitable olefins for use in the invention include 1-hexene, 1-octene, 1-decene, 1-dodecene, 1-tetradecene, 1-hexadecene and 1-octadecene all available from Chevron Chemical Company under Chevron's Gulftene® trademark. Blends of 1-eicocene/1-doeicocene/1-tetraeicocene, and 1-tetraeicocene/1-hexaeicocene/1-octaeicocene are also available from Chevron. Shell Chemical Company manufactures and sells 1-dodecene, 1-tetradecene and 1-hexadecene under Shell's Neodene® trademark. Other companies such as Albemarle Corporation make olefins suitable for this invention.

Preferred cationic emulsifiers include an amido amine quaternary salt and ether-amine-derived quaternary salt available from Tomah Products, Inc. of Milton, Wis. under the designations Emulsifier 4 and Q-14-2 respectively. Another preferred cationic emulsifier is an ether diamine (and its salt) available from Tomah Products as DA-17. Tomah Products E-14-2, an ethoxylated ether amine, is yet another suitable cationic emulsifier.

Preferred dialkyl quaternary salts include dicoco dimethyl ammonium chloride available from Tomah Products under the designation Q-2C and ditallow dimethyl ammonium chloride available from Hoechst Chemical under the trademark Propaegen 3445.

Preferred secondary emulsifier constituents include nonionic surfactants such as Union Carbine Triton N-101 and Tergitol NP-6, both of which are ethoxylated alkylphenols. One suitable amphoteric surfactant is Miranol FBS from Rhone-Poulenc. Preferred carboxybetaines and sulfobetaines are Miranol CB and Miranol CBS, respectively, both available from Rhone-Poulenc.

Suitable coupling agents include glycol ethers such as ethylene glycol monobutyl ether available from Union Carbide under the trademark Butyl Cellosolve and propylene glycol monobutyl ether sold by Dow Chemical under the trademark Dowanol PNB.

The invention may be produced or sold without water in the form of a dilutable concentrate or the invention may include up to about 70% water and may be sold as a further dilutable pre-mixed composition.

Other constituents and adjuvants may be added to the inventive composition and are clearly within the scope of this invention. These include supplemental hydrophobes such as mineral seal oil, aromatic and aliphatic hydrocarbons, silicones and water insoluble fatty esters such as butyl oleate sold by Anar. Adjuvants such as pefumants, pigments, dyes and optical brighteners may be included.

EXAMPLES AND COMPARISONS

The formulations of Examples 1–5 below and an old style spray wax formulation were tested on a vehicle surface to determine efficacy in water bead formation, drying time and durability after repeated rinsings. The luster imparted to the vehicle surface by each composition was also examined.

The old style spray wax formulation used as each test standard included 20 grams by weight of Kerr McGee mineral seal oil, 15 grams of Tomah Emulsifier-4, 1 gram of Triton N-101 and 3 grams of Union Carbide Butyl Cellosolve ether. These constituents were mixed with a spatula until homogeneous. 61 grams of tap water were then added in approximately 10 gram increments with stirring between each addition. After going through a hazy phase, the mixtures cleared when about ⅓ of the water had been added and stayed clear when all of the water was in the emulsion, making what is termed a "39% active spray wax."

Examples 1–5 used for the tests were prepared in the same way as the old style formulation used as the standard. In each case the noted amounts of the olefin, emulsifier and coupling agent constituents were combined and mixed until homogenous. In Examples 2 and 3 mineral seal oil was added to the composition as noted. The exemplary compositions were diluted with 61 grams of water as above to form 39% active spray waxes.

Prior to each test, the 39% active old style and exemplary compositions were diluted with water to a form most suitable for use in an automatic car wash. In each test, 3 ml of each 39% active spray wax composition was added to 3.785 l of water. Each dilute composition was shaken to mix the constituents.

The testing methodology used was the "split hood test" which is an accepted means to determine the efficacy of vehicle spray waxes. Each split hood test was performed on a clean automobile hood. The hood surface was cleaned using a detergent and the hood was considered to be clean when water poured on the hood did not bead. Water was poured on the hood before commencing each test to simulate a rinse cycle of an automatic car wash.

In each test, the entire 3.788 l sample of dilute old style spray wax was poured onto one half of the automobile hood and, simultaneously, the full 3.788 l of one exemplary composition was poured onto the other half of the automobile hood. Each composition was poured at the same rate and pouring was ended at the same time. Each composition was distributed to cover the entire surface area of its respective hood portion. The time needed for each hood portion to dry was recorded as were observations regarding the luster imparted to the vehicle hood surface.

Next, the durability of each exemplary composition was tested by rinsing the entire hood surface. The time needed for each hood portion to become 50% dry and 90% dry was recorded. Observations were made as to the surface luster.

Rinsing was performed at least once for each exemplary composition tested. Observations were again made as to drying time and luster imparted to the hood surface.

Each test was performed at approximately 40° F., which is a rigorous testing temperature for spray waxes or rinse or drying aids.

The five examples of the invention which were tested and comments on such tests are set forth below. Additional exemplary compositions of the invention are also provided.

EXAMPLE 1

| | |
|---|---|
| Shell Neodene 18 | 20.0 grams |
| Tomah Emulsifier 4 | 10.0 grams |
| Tomah E-14-2 | 6.0 grams |
| Union Carbide Butyl Cellosolve | 3.0 grams |
| Water | 61.0 grams |

Example 1 shows an exemplary composition with an eighteen carbon atom alpha olefin, an emulsifier component consisting of two cationic surfactants and a glycol ether coupling agent. Example 1 exhibited properties significantly better than the old style composition used as the test standard. The exemplary composition caused the hood surface to dry faster than the standard composition. Example 1 was also more durable than the standard composition resulting in consistently faster drying times after each of three rinses. The exemplary compound provided the hood surface with a distinctive luster.

EXAMPLE 2

| | |
|---|---|
| Shell Neodene 18 | 5.0 grams |
| Kerr McGee Mineral Seal Oil | 15.0 grams |
| Tomah Emulsifier 4 | 16.0 grams |
| Union Carbide Butyl Cellosolve | 3.0 grams |
| Water | 61.0 grams |

Example 2 shows an olefin blended with a mineral seal oil hydrophobe. Both the exemplary compound and old style composition used as the standard imparted a luster to the hood surface. However, the composition of Example 2 outperformed the standard because drying times were significantly faster than those of the standard composition. Example 2 proved more durable than the standard composition showing improved drying times over the standard after each of three rinses.

EXAMPLE 3

| | |
|---|---|
| Shell Neodene 2024 | 4.0 grams |
| Kerr McGee Mineral Seal Oil | 16.0 grams |
| Tomah Emulsifier 4 | 16.0 grams |
| Union Carbide Butyl Cellosolve | 3.0 grams |
| Water | 61.0 grams |

The compound of Example 3 includes an olefin blend consisting of 1-eicocene/1-doeicocene/1-tetraeicocene and a mineral seal oil. The olefin component is solid at room temperature, but can be formulated into a spray wax composition.

The compound of Example 3 exhibited properties significantly better than those of the old style composition used as the test standard. The exemplary composition caused the hood surface to dry faster than the standard. Example 3 was consistently more durable than the standard composition resulting in consistently faster drying times after three rinses. Both the standard and exemplary compositions imparted a luster to the hood surface.

EXAMPLE 4

| | |
|---|---|
| Shell Neodene 16 | 20.0 grams |
| Tomah Emulsifier 4 | 15.0 grams |
| Tomah E-14-2 | 1.0 gram |
| Union Carbide Butyl Cellosolve | 3.0 grams |
| Water | 61.0 grams |

Example 4 includes a sixteen carbon atom olefin and blended cationic emulsifier constituent. Example 4 exhibited comparable drying times to those of the old style composition used as the test standard. The exemplary compound imparted a luster to the surface.

EXAMPLE 5

| | |
|---|---|
| Albemarle $C_{18-24}$ | 20.0 grams |
| Tomah Emulsifier 4 | 16.0 grams |
| Dowanol PNB | 3.0 grams |
| Water | 61.0 grams |

Example 5 is an embodiment of the invention including a blended olefin consisting primarily of a mixture of 1-octadecene/1-eicocene/1-doeicocene/1-tetraeicocene, a cationic emulsifier and propylene glycol monobutyl ether coupling agent constituents. Example 5 was slightly less effective than the standard in drying the hood surface after the initial application. However, Example 5 was more durable than the standard showing a much greater rate of water bead formation and drying following one rinse. Example 5 imparted a luster to the hood surface.

EXAMPLE 6

| Shell Neodene 18 | 20.0 grams |
| Tomah Emulsifier 4 | 16.0 grams |
| Dowanol PNB | 3.0 grams |
| Water | 61.0 grams |

Example 6 is an embodiment of the invention including an eighteen carbon atom olefin, cationic emulsifier and propylene glycol monobutyl ether coupling agent constituents.

EXAMPLE 7

| Shell Neodene 18 | 20.0 grams |
| Tomah Q-2C | 15.5 grams |
| Triton N-101 | 0.5 grams |
| Dowanol PNB | 3.0 grams |
| Water | 61.0 grams |

Example 7 shows that a dicoco dimethyl ammonium chloride surfactant may be used as an emulsifier in place of Emulsifier 4. A nonionic secondary surfactant (Triton N-101) is also included in this example.

EXAMPLE 8

| Shell Neodene 12 | 20.0 grams |
| Tomah Emulsifier 4 | 15.0 grams |
| Tomah Q-14-2 | 1.0 gram |
| Union Carbide Butyl Cellosolve | 3.0 grams |
| Water | 61.0 grams |

In Example 8, 1-dodecene is used as the olefin constituent. As with the other examples, many alpha olefins are suitable constituents in the invention. These include 1-hexene, 1-octene, 1-decene, 1-dodecene, 1-tetradecene, 1-hexadecene, 1-octadecene, 1-eicocene, 1-doeicocene, 1-tetraeicocene, 1-hexaeicocene, 1-octaeicocene, 1-triacontene, blends of 1-octadecene/ 1-tetraeicocene, 1-eicocene/1-doeicocene/1-tetraeicocene, and 1-tetraeicocene/1-hexaeicocene/1-octaeicocene, 1-hexadecene, 1-octadecene, 1-eicocene, 1-doeicocene, 1-tetraeicocene, 1-hexadecene, 1-octaeicocene and mixtures thereof are most highly preferred olefin constituents.

EXAMPLE 9

| Anar Butyl Oleate | 14.0 grams |
| Shell Neodene 18 | 4.0 grams |
| Tomah Emulsifier 4 | 16.5 grams |
| Tomah Q-14-2 | 1.5 grams |
| Union Carbide Butyl Cellosolve | 3.0 grams |
| Water | 61.0 grams |

Example 9 shows use of an alpha olefin in conjunction with butyl oleate which is a hydrophobe consisting of a simple ester of a natural fatty acid. Other suitable esters may include methyl oleate, methyl soyate, methyl lardate, methyl cannolate, amyl laurate, methyl rapseedate and butyl tallate.

EXAMPLE 10

| Shell Neodene 18 | 9.0 grams |
| Dowanol PNB | 10.5 grams |

EXAMPLE 10-continued

| Tomah DA-17 | 5.8 grams |
| Anar Latol-4 | 3.3 grams |
| Glacial acetic acid | 1.4 grams |
| Water | 70.0 grams |

Example 10 demonstrates a composition including DA-17 which is a cationic ether diamine emulsifier. The salt of such ether diamine is made in situ by reaction with the Latol-4 (a tall oil fatty acid) and glacial acetic acid.

EXAMPLE 11

| Shell Neodene 18 | 20.0 grams |
| Hoechst Propaegen 3445 | 14.0 grams |
| Tomah Q-14-2 | 2.0 grams |
| Butyl Cellosolve | 3.0 grams |
| Water | 61.0 grams |

Example 11 includes a cationic ditallow dimethyl ammonium chloride emulsifier (Propaegen 3445). An ether-amine-derived quaternary salt (Tomah Q-14-2) is included to demonstrate that mixtures of cationic emulsifiers are suitable constituents of the invention.

EXAMPLE 12

| Shell Neodene 14 | 35.1 grams |
| Tomah Emulsifier 4 | 3.9 grams |
| Water | 61.0 grams |

Example 12 is an embodiment including olefin and emulsifier constituents without a secondary emulsifier or coupling agent. Suitable olefins include 1-hexene, 1-octene, 1-decene, 1-dodecene, 1-tetradecene, 1-hexadecene, 1-octadecene, 1-eicocene, 1-doeicocene, 1-tetraeicocene, 1-hexaeicocene, 1-octaeicocene, 1-triacontene, blends of 1-octadecene/1-tetraeicocene, 1-eicocene/1-doeicocene/1-tetraeicocene, and 1-tetraeicocene/1-hexaeicocene/1-octaeicocene, 1-hexadecene, 1-octadecene, 1-eicocene, 1-doeicocene, 1-tetraeicocene, 1-hexadecene, 1-octaeicocene and mixtures thereof are most highly preferred olefin constituents.

Other emulsifiers could be substituted for the Emulsifier 4 shown in Example 12. These include amidoamine salts, alkyl amine salts, alkyl diamine salts, alkyl quaternary salts, dialkyl amine salts, dialkyl quaternary salts, alkyl ether amine salts, alkyl ether diamine salts, alkyl ether amine quaternary salts, ethoxylated amines, ethoxylated ether amines, imidazoline quaternary salts imadazoline salts, amine oxides and mixtures thereof. Ditallow dimethyl ammonium chloride, ditallow dimethyl ammonium methosulfate, dicoco dimethyl ammonium chloride and dicoco dimethyl ammonium methosulfate and mixtures thereof are particularly favored dialkyl quaternary salts.

The amount of the olefin and emulsifier constituents of Example 12 may be adjusted and yet remain within the scope of this invention. For example, compositions such as Example 12 in which the olefin constitutes 3.9 grams and the emulsifier constitutes 35.1 grams are functional, dilutable concentrates according to the invention.

EXAMPLE 13

| Shell Neodene 18 | 9.75 grams |
| --- | --- |
| Propaegen 3445 | 9.75 grams |
| Ethanol | 19.50 grams |
| Water | 61.00 grams |

Example 13 includes an alpha olefin with 18 carbon atoms and a ditallow dimethyl ammonium chloride emulsifier. Other olefins and emulsifiers may be substituted for those shown in the example as described in the specification.

The ethanol coupling agent of the example may be replaced by methanol, propanol, isopropanol, butanol, pentanol, hexanol and mixtures thereof. Glycol ethers such as ethylene glycol monobutyl ether, diethylene glycol monobutyl ether, propylene glycol monobutyl ether, propylene glycol monopropyl ether, dipropylene glycol monobutyl ether, dipropylene glycol monomethyl ether and mixtures thereof are also suitable coupling agents.

EXAMPLE 14

| Shell Neodene 18 | 9.75 grams |
| --- | --- |
| Tomah Emulsifier 4 | 9.75 grams |
| Union Carbide Tergitol NP-6 | 19.50 grams |
| Water | 61.00 grams |

Example 14 includes a second, nonionic, emulsifier designated as Tergitol NP-6. Other nonionic surfactants may be used in place of or blended with the Tergitol NP-6 including Triton N-101, and ethoxylated alcohols.

Amphoteric surfactants such as amino acid amphoterics and betaines may be used with, or in place of, the nonionic surfactant shown in the example. Suitable amino acid amphoterics include alkyl amine propionates, alkyl amine dipropionates, N-alkyl-(beta)-imino acids, imadazoline carboxylates and mixtures thereof. Highly preferred betaines include carboxybetaines such as Mirataine CB from Rohne-Poulenc and sulfobetaines such as Mirataine CBS from Rohne-Poulenc.

While the principles of this invention have been described in connection with specific embodiments, it should be understood clearly that these descriptions are made only by way of example and are not intended to limit the scope of the invention.

What is claimed:

1. A spray wax coating composition for post-wash application to vehicle body surfaces by automatic vehicle-washing devices and for use as an aid in drying the vehicle body surfaces comprising:

10 to 80% by weight of at least one olefin for forming a water-repellant film on the vehicle body surfaces each such olefin having the general structural formula:

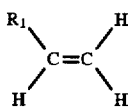

wherein $R_1$ is an alkyl group having between 4 to 28 carbon atoms; and 20 to 90% by weight of an emulsifier composition including at least one cationic constituent for depositing the composition on the vehicle body surface;

thereby providing a drying agent suitable for dilution and subsequent application to vehicle body surfaces at concentrations of about 0.2% to 2%.

2. The composition of claim 1 wherein $R_1$ is an alkyl group having between 10 to 26 carbon atoms.

3. The composition of claim 2 wherein the olefin is selected from the group consisting of 1-hexadecene, 1-octadecene, 1-eicocene, 1-doeicocene, 1-tetraeicocene, 1-hexaeicocene, 1-octaeicocene and mixtures thereof.

4. The composition of claim 1 wherein the cationic constituent is selected from the group consisting of amido amine quaternary salts, amido amine salts, alkyl amine salts, alkyl diamine salts, alkyl quaternary salts, dialkyl amine salts, dialkyl quaternary salts, alkyl ether amine salts, alkyl ether diamine salts, alkyl ether amine quaternary salts, ethoxylated amines, ethoxylated ether amines, imidazoline quaternary salts, imadazoline salts, amine oxides and mixtures thereof.

5. The composition of claim 4 wherein the dialkyl quaternary salts are selected from the group consisting of ditallow dimethyl ammonium chloride, ditallow dimethyl ammonium methosulfate, dicoco dimethyl ammonium chloride, dicoco dimethyl ammonium methosulfate and mixtures thereof.

6. The composition of claim 1 further including up to 50% of a second emulsifier composition.

7. The composition of claim 6 wherein the second emulsifier is selected from the group consisting of nonionic surfactants, amphoteric surfactants and mixtures thereof.

8. The composition of claim 7 wherein the nonionic surfactants are selected from the group consisting of ethoxylated alkyl phenols, ethoxylated alcohols and mixtures thereof.

9. The composition of claim 7 wherein the amphoteric surfactants are selected from the group consisting of amino acid amphoterics and betaines and mixtures thereof.

10. The composition of claim 9 wherein the amino acid amphoterics are selected from the group consisting of alkyl amine propionates, alkyl amine dipropionates, N-alkyl-(beta)-imino acids, imadazoline carboxylates and mixtures thereof.

11. The composition of claim 9 wherein the betaines are selected from the group consisting of carboxybetaines and sulfobetaines and mixtures thereof.

12. The composition of claim 1 further including up to 50% of a coupling agent.

13. The composition of claim 12 wherein the coupling agent is selected from the group consisting of glycol ethers, alcohols and mixtures thereof.

14. The composition of claim 13 wherein the glycol ethers are selected from the group consisting of ethylene glycol monobutyl ether, diethylene glycol monobutyl ether, propylene glycol monobutyl ether, propylene glycol monopropyl ether, dipropylene glycol monobutyl ether, dipropylene glycol monomethyl ether and mixtures thereof.

15. The composition of claim 13 wherein the alcohol is selected from the group consisting of methanol, ethanol, propanol, isopropanol, butanol, pentanol, hexanol and mixtures thereof.

16. The invention of claim 1 further including a hydrophobe constituent selected from the group consisting of mineral seal oil, aromatic and aliphatic hydrocarbons and water insoluble esters of natural fatty acids.

17. A spray wax coating composition for post-wash application to vehicle body surfaces by automatic vehicle-washing devices and for use as an aid in drying vehicle body surfaces comprising:

10 to 80% by weight of at least one olefin for forming a water-repellant film on the vehicle body surfaces each such olefin having the general structural formula:

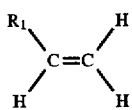

wherein $R_1$ is an alkyl group having between 4 to 28 carbon atoms; and 20 to 90% by weight of a first emulsifier composition including at least one cationic constituent for depositing the composition on the vehicle body surface;

up to 50% by weight of a second emulsifier composition; and up to 50% by weight of a coupling agent;

thereby providing a drying agent suitable for dilution and subsequent application to vehicle body surfaces at concentrations of about 0.2% to 2%.

18. The composition of claim 17 wherein $R_1$ is an alkyl group having between 10 to 26 carbon atoms.

19. The composition of claim 18 wherein the olefin is selected from the group consisting of: 1-hexadecene, 1-octadecene, 1-eicocene, 1-doeicocene, 1-tetraeicocene, 1-hexaeicocene, 1-octaeicocene and mixtures thereof.

20. The composition of claim 17 wherein the first emulsifier is selected from the group consisting of: amido amine quaternary salts, amido amine salts, alkyl amine salts, alkyl diamine salts, alkyl quaternary salts, dialkyl amine salts, dialkyl quaternary salts, alkyl ether amine salts, alkyl ether diamine salts, alkyl ether amine quaternary salts, ethoxylated amines, ethoxylated ether amines, imidazoline quaternary salts imadazoline salts, amine oxides and mixtures thereof.

21. The composition of claim 20 wherein the dialkyl quaternary salts are selected from the group consisting of ditallow dimethyl ammonium chloride, ditallow dimethyl ammonium methosulfate, dicoco dimethyl ammonium chloride, dicoco dimethyl ammonium methosulfate and mixtures thereof.

22. The composition of claim 17 wherein the second emulsifier is selected from the group consisting of nonionic surfactants, amphoteric surfactants and mixtures thereof.

23. The composition of claim 17 wherein the coupling agent is selected from the group consisting of glycol ethers, alcohols and mixtures thereof.

24. The composition of claim 17 further including up to about 70% water.

25. The invention of claim 17 further including a hydrophobe constituent selected from the group consisting of mineral seal oil, aromatic and aliphatic hydrocarbons and water insoluble esters of natural fatty acids.

* * * * *